US006229835B1

United States Patent
Tomaru et al.

(10) Patent No.: US 6,229,835 B1
(45) Date of Patent: May 8, 2001

(54) COMPACT SOLID-STATE LASER AND TRANSMITTER USING THE SAME

(75) Inventors: Tatsuya Tomaru, Hiki-gun; Hrvoje Petek, Iruma-gun, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/205,614

(22) Filed: Dec. 4, 1998

Related U.S. Application Data

(63) Continuation-in-part of application No. 08/997,700, filed on Dec. 23, 1997, now Pat. No. 6,091,495.

(30) Foreign Application Priority Data

Dec. 5, 1997 (JP) ..................................................... 9-335276

(51) Int. Cl.⁷ .............................. H01S 3/098; H01S 5/00; H01S 3/08
(52) U.S. Cl. ................................ 372/45; 372/18; 372/92; 372/98; 372/99
(58) Field of Search ................................ 372/45, 18, 99, 372/98, 92

(56) References Cited

U.S. PATENT DOCUMENTS

| | | | |
|---|---|---|---|
| Re. 34,192 | * 3/1993 | Baer ........................................ | 372/10 |
| 5,136,596 | * 8/1992 | Rao et al. ............................... | 372/20 |
| 5,249,193 | * 9/1993 | Watanabe ............................... | 372/23 |
| 5,856,996 | * 1/1999 | Durkin et al. .......................... | 372/98 |
| 5,986,234 | * 11/1999 | Mathews et al. ..................... | 219/121 |

FOREIGN PATENT DOCUMENTS

| | | | |
|---|---|---|---|
| 851205 A2 | * 1/1998 | (EP) . | |
| 4-025084 | * 1/1992 | (JP) . | |

OTHER PUBLICATIONS

Optics Letters, vol. 21, No. 2, Jan. 15, 1996, "Compact Kerr–lens model–locked resonator", B.E. Bouuma et al, pp. 134–136.*
Optics Letters, vol. 19, No. 3, Feb. 1, 1994, "Chirped multilayer coating for broadband dispersion control in femtsecond laser", R. Szipocs et al, pp. 201–203.*
Optics Letters, vol. 19, No. 14, Jul. 15, 1994, "Self–starting Kerr–lens mode locking of a Ti:sapphier laser", G. Cerullo et al, pp. 1040–1042.*
Japanese Journal of Applied Physics, vol. 35, 1996, "All–Solid–State Mirror–Dispersion–Controlled Sub–10 fs Ti:Sapphier Laser", K. Yamanak et al, pp. L989–L991.*
Kogaku, vol. 24, No. 7, (1995, 7), "Ultra Short Pulse Technology", S. Watanabe, pp. 378(8)–383(13).*
"Center Mount", Models 9807, 9813M and 9855 manufactured by v–Focus (Corp.).*
Ultima Series, manufactured by Newport (Corp.).
B.E. Bouma et al., "Compact Kerr–lens Mode–Locked Resonators", OPTICS.*
Letters, vol. 21, No. 2, Jan. 15, 1996, pp. 134–136.*
T. Sorokina et al., "Femtosecond Pulse Generation From the Novel Low–Loss Chirped–Mirror Dispersion Controlled Cr:LiSAF and Cr:LiSGaF Lasers", OSA Trends in Optics and Photonics Series, vol. 10 – Advanced Solid State Laser, Jan. 1997, pp. 322–325.*

* cited by examiner

Primary Examiner—Frank G. Font
Assistant Examiner—Armando Rodriguez
(74) Attorney, Agent, or Firm—Mattingly, Stanger & Malur

(57) ABSTRACT

A compact solid-state laser has its cavity formed by the reflection surface of a gain crystal and the reflection surface of a chirped mirror. Pumping light is incident to the cavity through the reflection surface of the gain crystal or the chirped mirror, from which the laser output is led out. Forming of the cavity solely by the gain crystal and chirped mirror enables the elimination of additional component parts for the compensation of dispersion, thereby making the entire laser system compact, and consequently permitting an increase in the repetition frequency.

22 Claims, 6 Drawing Sheets

COMPACT SOLID-STATE LASER AND TRANSMITTER USING THE SAME

CROSS-REFERENCE TO RELATED APPLICATION

This application is a continuation-in-part of U.S. patent application Ser. No. 08/997,700 filed on Dec. 23, 1997 now U.S. Pat. No. 6,091,495, which is now pending to USPTO and the disclosure of which is incorporated herein by reference.

BACKGROUND OF THE INVENTION

The present invention relates to a compact solid-state laser, and particularly to a compact solid-state laser used for a multiwavelength optical source for a wavelength-division-multiplexed communication system, a wide-spectrum optical source for spectroscopy, a ultra-short pulse source for distance measurement, a ultra-short pulse source for instrumentation, and the like. The invention also relates to a transmitter using this compact solid-state laser.

Various cavity structures for the solid-state laser have been proposed, as described for example in publication "Ultra Short Pulse Technology" ("KOGAKU" Japanese Journal of Optics, Vol.24, No.7, pp.378). Their basic structure includes four or more mirrors which form a cavity, a gain crystal as gain medium, and a prism pair or a grating pair which compensates the dispersion attributable to the gain crystal.

However, this basic structure has too many component parts and needs to space the prism pair or grating pair by several tens centimeters for dispersion compensation. Therefore, this structure it does not allow for the compact design of a solid-state laser. In the case of pulsative operation, the repetition frequency cannot be raised unless the cavity length is made short. The conventional solid-state laser has a repetition frequency of around 100 MHz, whereas the solid-state laser used for the communication system must have a repetition frequency of several gigahertz or higher.

There is a proposal for making the solid-state laser compact so that its repetition frequency is higher, as described in the article entitled "Compact Kerr-lens model-locked resonator" by B. E. Bouuma et al. in OPTICS LETTERS, Vol.21, No.2, pp.134–136, published in 1996. The proposed compact Kerr-lens model-locked resonator has its cavity made up of three elements including a gain crystal, a curved mirror, and a prismatic output coupler.

SUMMARY OF THE INVENTION

It is an object of the present invention to make the solid-state laser compact so that its repetition frequency is several gigahertz or higher and it is usable for the communication system.

For making a compact solid-state laser, it is necessary to reduce the number of component parts and compensate the dispersion attributable to the gain crystal without using the prism pair or grating pair. The above-mentioned proposal by B. E. Bouuma et al. uses a prism and a crystal pair, instead of using a prism pair, for dispersion compensation, thereby reducing the number of cavity elements to three so as to provide a compact solid-state laser.

In contrast, the present invention is intended to offer a compact solid-state laser which is designed to compensate the dispersion by means of a chirped mirror formed by multilayer coating (described in the article entitled "Chirped multilayer coating for broadband dispersion control in femt- second laser" by Robert Szipocs et al. in OPTICS LETTERS, Vol.19, No.3, pp.201–203, published in 1994), so that the cavity is virtually formed of only two elements of a chirped mirror and a gain crystal. Specifically, the gain crystal has its one side rendered with a reflection coating, chirped-mirror coating, or saturable-absorber mirror coating so that it functions as a mirror, with the chirped mirror serving as another mirror of the cavity, thereby reducing the number of mirrors required.

DESCRIPTION OF THE PREFERRED EMBODIMENTS

Figure 1:
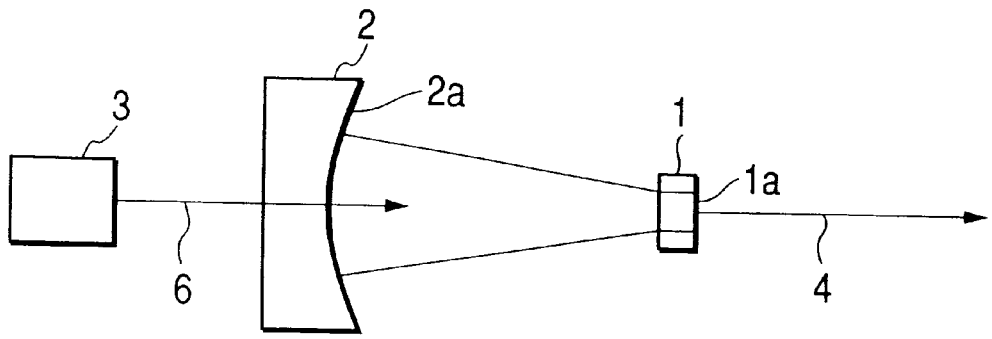
FIG. 1 is a diagram showing the arrangement of a compact solid-state laser based on an embodiment of this invention.

Embodiments of this invention will be explained with reference to the drawings.

FIG. 1 through FIG. 4 show the arrangements of compact solid-state laser based on the embodiments of this invention. The compact solid-state laser has its cavity formed between the right-side reflection surface 1a of a gain crystal 1 and the right-side reflection surface 2a of a chirped mirror 2. Reference numeral 6 denotes the pumping light directed to the gain crystal 1, 3 is the optical source of the pumping light, 4 is the laser output, and 5 is a dichroic mirror which diverts the course of the laser output 4.

The compact solid-state laser can have several arrangements depending on the manner of leading in the pumping light 6 and leading out the laser output 4, of which four representative types are shown in FIG. 1 through FIG. 4.

Figure 2:
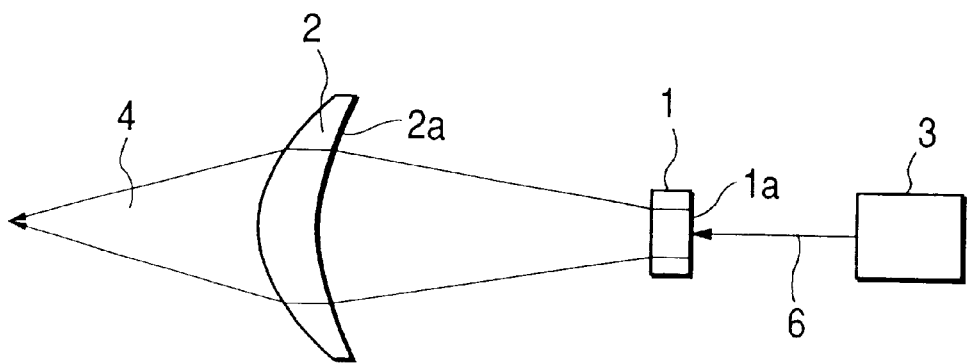
FIG. 2 is a diagram showing the arrangement of a compact solid-state laser based on another embodiment of this invention.
Figure 3:
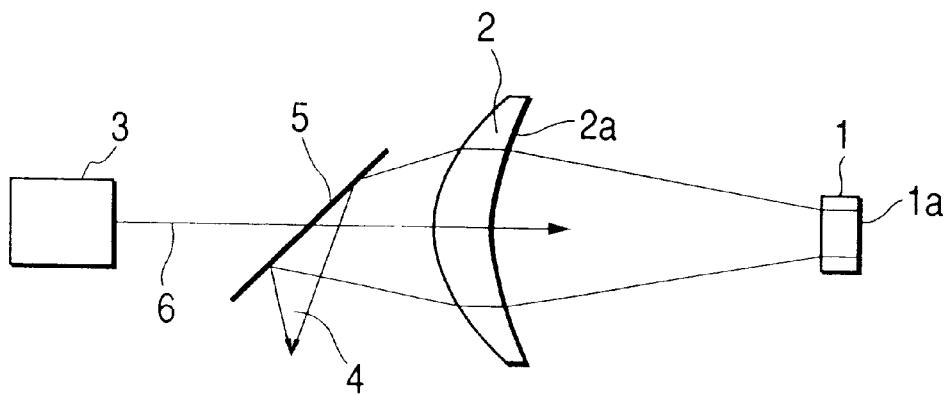
FIG. 3 is a diagram showing the arrangement of a compact solid-state laser based on still another embodiment of this invention.
Figure 4:
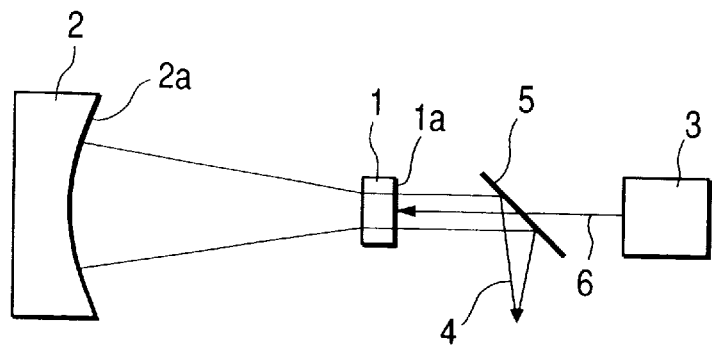
FIG. 4 is a diagram showing the arrangement of a compact solid-state laser based on still another embodiment of this invention.

In the arrangement of FIG. 1, the pumping light 6 is incident to the chirped mirror 2 from its back, and the laser output 4 is led out from the reflection surface 1a of the gain crystal 1. In the arrangement of FIG. 2, the pumping light 6 is incident to the reflection surface 1a of the gain crystal 1, and the laser output 4 is led out from the back of the chirped mirror 2. In the arrangement of FIG. 3, the pumping light 6 is introduced into the cavity by being incident to the back of the chirped mirror 2 through the dichroic mirror 5, and the laser output 4 is taken out from the back of the chirped mirror 2 and led out by being diverted by the dichroic mirror 5. In the arrangement of FIG. 4, the pumping light 6 and the laser output 4 exist on the side of the right-side reflection surface 1a. In the arrangement of FIG. 4, the pumping light 6 is introduced into the cavity by being incident to the reflection surface 1a of the gain crystal 1 through the dichroic mirror 5, and the laser output 4 is taken out from the reflection surface 1a of the gain crystal 1 and led out by being diverted by the dichroic mirror 5.

Figure 5:
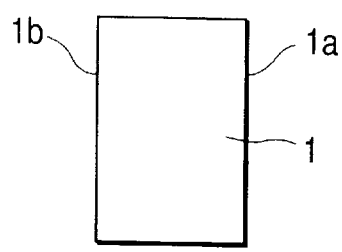
FIG. 5 is a diagram showing an embodiment of the gain crystal which can be used for the inventive compact solid-state laser.
Figure 6:
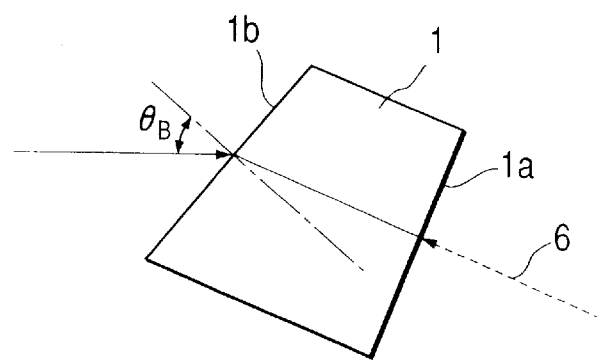
FIG. 6 is a diagram showing another embodiment of the gain crystal which can be used for the inventive compact solid-state laser.
Figure 7:
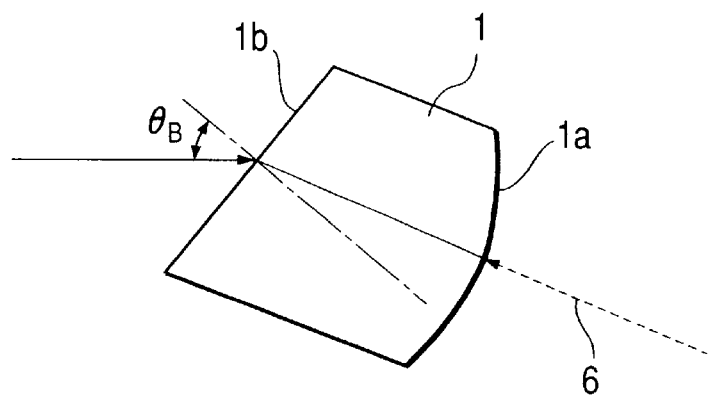
FIG. 7 is a diagram showing still another embodiment of the gain crystal which can be used for the inventive compact solid-state laser.

The gain crystal 1 used in the foregoing arrangements of solid-state laser can have various structures as shown in FIG. 5, FIG. 6 and FIG. 7. In any case, the gain crystal 1 has its right-side reflection surface 1a rendered with a reflection coating, chirped mirror coating, or saturable-absorber mirror coating. For leading out the laser output 4 from the reflection surface 1a of the gain crystal 1, as in the cases of FIG. 1 and FIG. 4, the reflection surface 1a is coated to become an output-coupler mirror of several percent or less. For leading out the laser output 4 from the back of the chirped mirror 2, as in the cases of FIG. 2 and FIG. 3, the gain crystal 1 has its reflection surface 1a rendered the high-reflection coating.

The gain crystal 1 has its left-side surface 1b rendered the anti-reflection coating, and further may be rendered with a saturable-absorber coating, instead of the saturable-absorber mirror coating of the reflection surface 1a, as shown in FIG. 5. Or, the gain crystal 1 is polished to provide a Brewster angle $\theta_B$ so as to suppress the reflection, as shown in FIG. 6 and FIG. 7. Shown in FIG. 6 is the simplest structure of gain crystal having a Brewster angle $\theta_B$, with its reflection surface 1a being rendered with a planar cutting.

However, the Brewster angle $\theta_B$ differs slightly depending on the wavelength. Accordingly, in dealing with a wide spectrum as in the case of ultra-short pulse oscillator, the optical path varies in the gain crystal 1. It can be correct effectively by the provision of a cylindrical curving surface for the reflection surface 1a as shown in FIG. 7. Shown by the dashed line 6 in FIG. 6 and FIG. 7 is the incident pumping light 6 of the case of incidence on the side of the reflection surface 1a.

Figure 8:
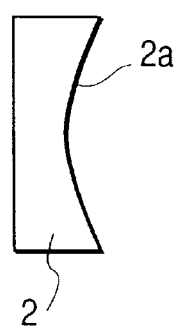
FIG. 8 is a diagram showing an embodiment of the chirped mirror which can be used for the inventive compact solid-state laser.
Figure 9:
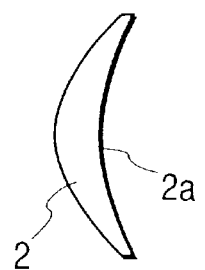
FIG. 9 is a diagram showing another embodiment of the chirped mirror which can be used for the inventive compact solid-state laser.

FIG. 8 and FIG. 9 show examples of the structure of chirped mirror 2 which can be used in the foregoing arrangements of solid-state laser. The chirped mirror 2 is a concave mirror having a focal distance of around several tens millimeters, which is determined depending on the repetition frequency. The chirped mirror has a multilayer coating on the right-side surface 2a as shown in FIG. 8 and FIG. 9.

In the arrangement of FIG. 4, where the pumping light 6 and laser output 4 are led in and out on the side of the reflection surface 1a of the gain crystal 1, the chirped mirror 2 may have its unused back surface (opposite to its mirror surface 2a) simply left planar as shown in FIG. 8.

On the other hand, in the arrangements of FIG. 1, FIG. 2 and FIG. 3, where the pumping light 6 or laser output 4 is led in or out on the side of the chirped mirror 2 opposite to its mirror surface 2a, the respective optical systems are required on that side. In the arrangement of FIG. 1, where only the pumping light 6 is incident to the back surface of the chirped mirror 2 opposite to its mirror surface 2a, the mirror 2 may have its back surface simply left planar as shown in FIG. 8. In the arrangement of FIG. 2 and FIG. 3, where the laser output 4 is focused, the chirped mirror 2 may be designed to have its solid body working as a focusing lens so that the whole device becomes much smaller.

In addition, in the arrangements of FIG. 1, FIG. 2 and FIG. 3, where the pumping light 6 or laser output 4 is led in or out on the side of the chirped mirror 2 opposite to its mirror surface 2a, it is effective to provide a anti-reflection coating on this surface.

The pumping optical source 3 is a solid-state laser or a semiconductor laser, the latter being useful for the compactness of the whole device. The pumping optical source 3 may include a lens system for the enhancement of pumping ability, and may include an isolator, also.

Figure 10:
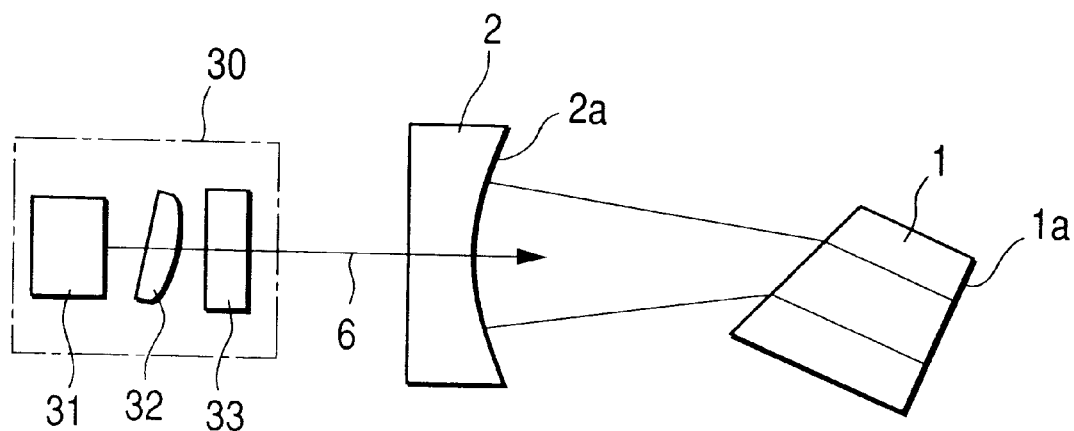
FIG. 10 is a diagram showing the arrangement of a compact solid-state laser in which a Brewster-cut gain crystal is used and the lens in optical source is tilted for astigmatism compensation.

The pumping optical source 3, gain crystal 1 and chirped mirror 2 have a common optical axis obviously, as will be explained in regard to the structure in connection with the transmitter of optical communication system. In case that gain crystal 1 is a Brewster-cut one like FIG. 6 or FIG. 7, and that pumping light 6 is introduced into the cavity through the chirped mirror 2 like FIG. 1 or FIG. 3, then the lens 32 in optical source 30 is tilted by a few or more degrees to compensate for astigmatism, as shown in FIG. 10, where an isolator 33 is also drawn.

Figure 11:
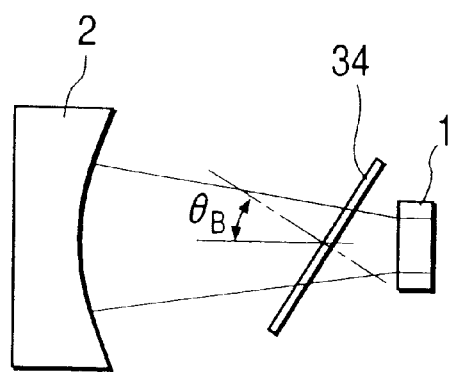
FIG. 11 is a diagram showing the arrangement of a compact solid-state laser in which a glass or fused-silica plate is set to break rotational symmetry with respect to optical beam and to improve polarization characteristics.

When gain crystal 1 is a simple plane parallel structure as shown in FIG. 5, then the cavity has rotational symmetry with respect to optical beam, and the light is not polarized, leading to poor laser characteristics. To circumvent this problem, a glass or fused-silica plate 34 may be set in the cavity at a Brewster angle $q_B$, as shown in FIG. 11.

Next, an embodiment of the transmitter, with the foregoing compact solid-state laser being applied thereto, will be explained.

Among the materials useful for the gain crystal 1, which include Cr-doped YAG (Cr:YAG crystal), Ti-doped $Al_2O_3$, Cr-doped LiSAF, Cr-doped $Mg_2SiO_4$, Nd-doped glass etc., the compact solid-state laser used in this transmitter adopts the Cr:YAG crystal having an oscillation wavelength of the 1.5-$\mu$m band. The absorption band of the Cr:YAG crystal has a peak at a wavelength around 1.05 $\mu$m.

For the pumping optical source 3, a solid-state laser of Nd:YVO$_4$, Nd:YLF or Nd:YAG, or a semiconductor laser can be used. The Cr:YAG laser has a wide spectrum (200 nm at maximum) when it is operated in ultra-short pulse oscillation, and accordingly it is useful for the optical source of the wavelength-division-multiplexed communication system.

Figure 12A:
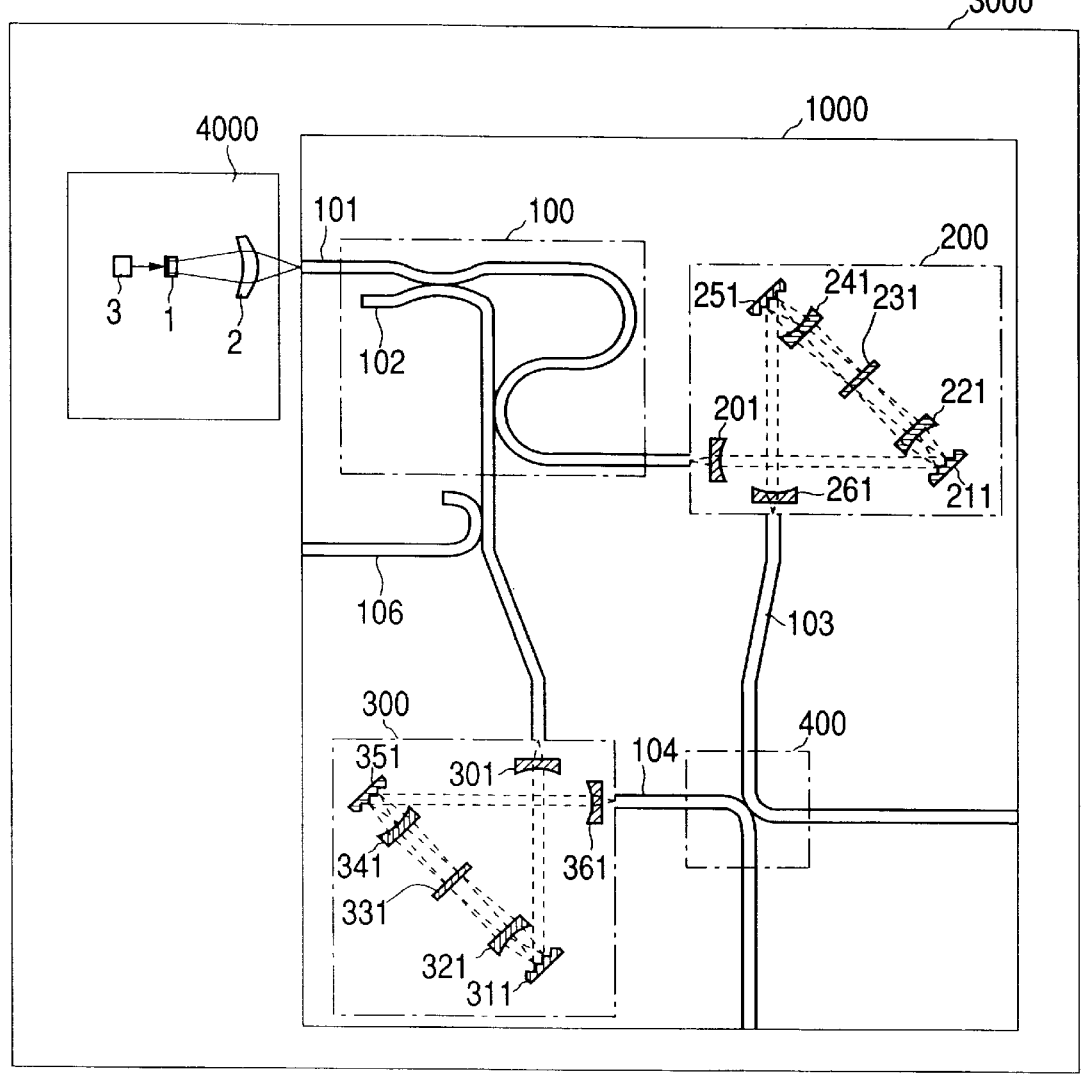
FIGS. 12A and 12B are a plan view and side view of a transmitter of the wavelength-division-multiplexed communication system, with the inventive compact solid-state laser being applied thereto.
Figure 12B:
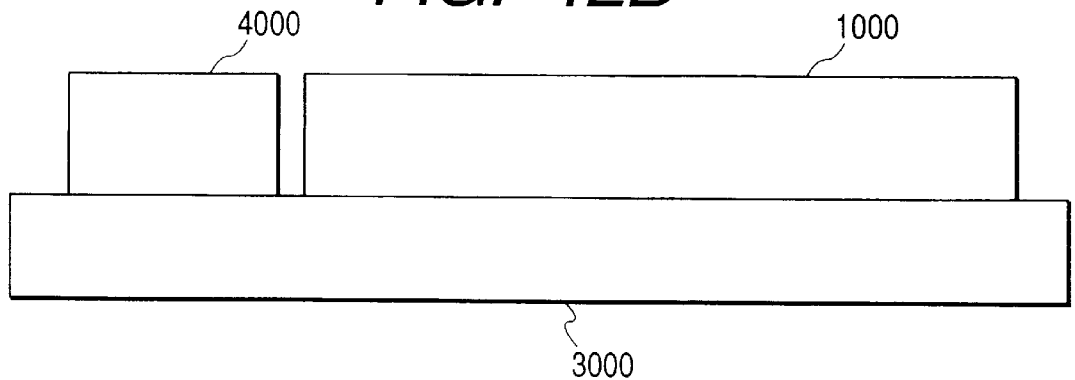

FIGS. 12A and 12B show the plan view and side view of a transmitter of wavelength-division-multiplexed communication system which employs a compact solid-state laser of Cr:YAG. Indicated by numeral 4000 is the Cr:YAG laser, which consists of a pumping optical source 3, a gain crystal 1 and a chirped mirror 2, as has been shown in FIG. 2, and it provides all wavelengths necessary for the wavelength-division-multiplexed communication system. Indicated by 1000 is a signal synthesizer, which converts the light, which comes from the Cr:YAG laser 4000 and is incident to the optical fiber 101, into wavelength-division-multiplexed signals in response to the signals to be transmitted. Indicated by 3000 is a constant-temperature maintaining device, which maintains the suitable temperature for the operation of the signal synthesizer 1000 and Cr:YAG laser 4000 and also serves for the chassis of these parts.

The signal synthesizer 1000 can be the one that has been offered in the U.S. patent application Ser. No. 08/997,700 (and the corresponding EP patent publication EP 0 851 205) which is the preceding patent application of the present application, and it will be explained here only briefly.

The incident light from Cr:YAG laser 4000 is introduced into a waveguide 101. The incident light is introduced into an optical path constituting the interferometer 100 through the waveguide 101. Since the other waveguide 102 contacts the waveguide 101 so as to form a separation path in the interferometer 100, the incident light is divided into two optical-paths corresponding to the waveguides 101 and 102. These two optical-paths are brought into contact with each other again at positions where their optical path lengths differ from each other. As a result, interference occurs in the above-described incident light and hence waveforms having predetermined spectrum are obtained from exits of the optical paths 101 and 102. The light emitted from the optical path 101 and the light emitted from the optical path 102 are introduced into the multichannel modulators 200 and 300, respectively. The multichannel modulators 200 and 300 are substantially identical in configuration to each other. The light or optical pulses launched from the optical paths 101 and 102 to the multichannel modulators 200 and 300 are set to parallel light beams by cut-away portions 201 and 301 having plano-concave shapes acting plano-convex lenses, respectively. The parallel light beams transmitted through the cut-away portions 201 and 301 are respectively introduced to cut-away portions 211 and 311 serving as diffraction gratings. The light or optical pulses separated into every frequency by the diffraction gratings 211 and 311 are focused on the spatial light modulators 231 and 331 every frequency through cut-away portions 221 an 321 acting plano-convex lenses. The spatial light modulators 231 and 331 allow the light or optical pulses subjected to optical modulation every frequency to pass therethrough according to the modulating signals $S_1$ and $S_2$ because voltages for varying absorptance or refractive index are respectively applied to focusing positions associated with each frequency. The optical pulses transmitted through the spatial light modulators 231 and 331 are respectively introduced to cut-away portions 251 and 351 used to serve as diffraction gratings through cut-away portions 241 and 341 functioning as plano-convex lenses, where they are restored to the parallel light beams. The optical pulses restored to the parallel light beams are focused on their corresponding optical paths 103 and 104 through cut-away portions 261 and 361 acting plano-convex lenses. The optical pulses introduced into the optical paths 103 and 104 are coupled by the optical coupler 400 so that a signal waveform for sending is obtained. In FIG. 12A, signal lines for the spatial light modulators 231 and 331 are omitted.

The output signal is transmitted in an arbitrary manner to a receiving terminal, in which the signal is demultiplexed by means of a proper demultiplexer and detected in terms of individual wavelengths by means of proper detectors.

Figure 13:
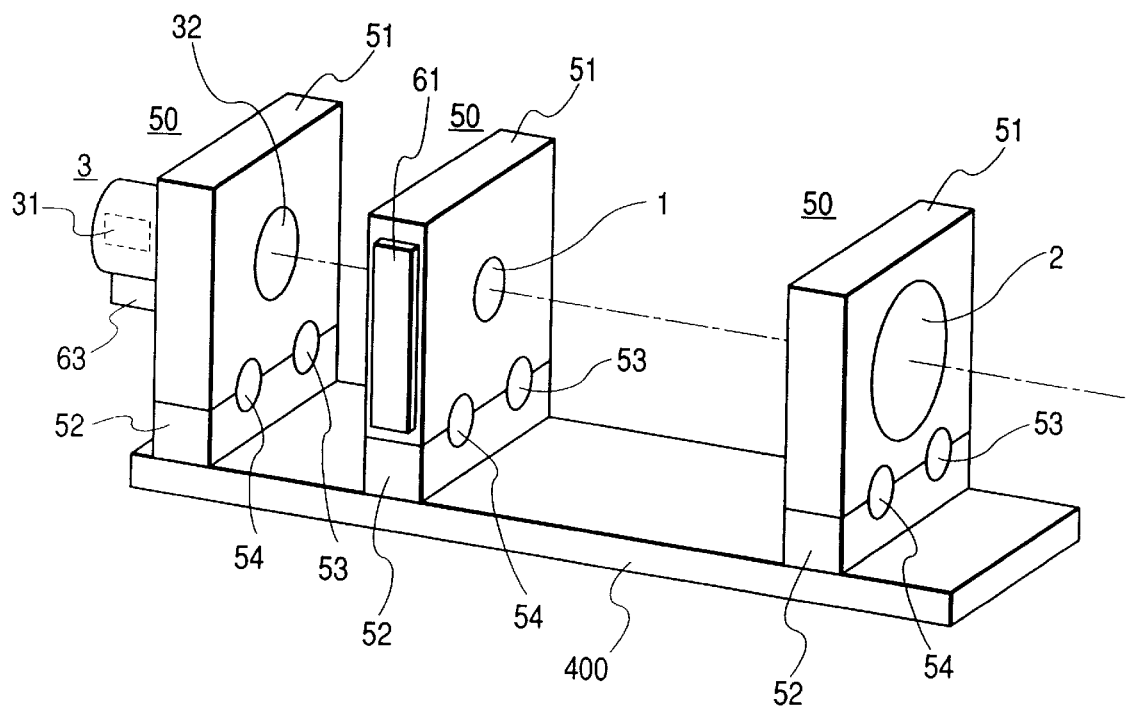
FIG. 13 is a perspective view of the compact solid-state laser used in the transmitter shown in FIG. 10A.

FIG. 13 illustrates the compact solid-state laser 4000 shown in FIG. 12. Attached on a base plate 400 having a small coefficient of thermal expansion are part holders 50 each consisting of a holder 51 for mounting the pumping optical source 3, gain crystal 1 or chirped mirror 2, and a fixture 52 which serves to fix the holder 50 to the base plate 400. A pair of vertical angle adjusting means 53 and horizontal angle adjusting means 54 are equipped between the holder 51 and fixture 52. After the parts 3, 1 and 2 are mounted on the holders 51 and the fixtures 52 are fixed to the base plate 400, the angle adjusting means 53 and 54 are operated so that these parts have a common optical axis as shown by the dash-dot line.

The part holders 50 and associated angle adjusting means 53 and 54, which are shown very simply in the figure, are specifically commercially-available holders named "CENTER MOUNT", Models 9807,9813M & 9855 manufactured by v-Focus Corp., or holders named "ULTIMA Series" manufactured by Newport Corp., for example.

In this embodiment, the pumping optical source 3 is made up of a semiconductor laser 31 and a convergent lens 32. The pumping optical source 3 may also include an isolator between the convergent lens 32 and the gain crystal 1 although it is not shown in FIG. 13. The gain crystal 1 produces much heat which cannot be conducted sufficiently to the constant-temperature maintaining device 3000 through the part holder 50 and base plate 400, and therefore there are attached Peltier's elements 61 on both side walls of the holder 51 of the gain crystal 1. Another Peltier's element 63 is attached to the pumping optical source 3 in its section close to the semiconductor laser 31, so that the laser 31 is cooled and the tuning of wavelength based on temperature control is made possible. The wiring of the Peltier's elements are not shown in the figure.

According to this embodiment, the transmitter can be made compact based on the compact solid-state laser and signal synthesizer.

The conventional solid-state laser is not small enough, and therefore it is virtually limited to experimental uses by specialists.

Many of the solid-state laser have wide gain bandwidths and are operative in ultra-short pulsation, and have superior characteristics that are missing in the semiconductor laser. The inventive compact solid-state laser is capable of being built in a variety of measuring instruments.

In the conventional wavelength-division-multiplexed communication system, multiple laser devices are arrayed to arrange optical sources, whereas, using such a solid-state laser as a Cr:YAG laser enables the generation of multiple wavelengths from a single optical source.

The inventive compact solid-state laser which is operative at a higher repetition frequency can readily be incorporated in the wavelength-division-multiplexed communication system, and will significantly the transmission capacity of wavelength-division-multiplexed communication system.

What is claimed is:

1. A compact solid-state laser comprising: a pumping optical source and a cavity comprising a gain crystal having a reflection coating on one surface, which is excited by said pumping optical source and amplifies lasing light; and a curving chirped mirror, which is positioned on an opposite side of said one surface of said gain crystal, with a multilayer coating being provided thereon, which reflects light amplified by said gain crystal an d compensates for dispersion attributable to said gain crystal.

2. A compact solid-state laser according to claim 1, wherein said one surface of said gain crystal forming the cavity is coated with a reflective chirped mirror coating or saturable-absorber mirror coating instead of said reflection coating.

3. A compact solid-state laser according to claim 1, wherein a surface of said gain crystal opposite to said one surface is provided with an anti-reflection coating or saturable-absorber coating instead of the saturable-absorber mirror coating of said one surface.

4. A compact solid-state laser according to claim 1, wherein said gain crystal has an inclination relative to the optical axis such that the light is incident to a surface of said gain crystal opposite to said one surface at the Brewster angle.

5. A compact solid-state laser according to claim 4, wherein said one surface of said gain crystal is a planar surface or a cylindrical curving surface.

6. A compact solid-state laser according to claim 1 wherein said chirped mirror has a curving surface and transmits a certain amount of light to thereby lead out the laser light from said cavity.

7. A compact solid-state laser according to claim 1, wherein said one surface of said gain crystal transmits a certain amount of light to thereby lead out the laser light from said cavity.

8. A compact solid-state laser according to claim 6, wherein a substrate of said chirped mirror having a curving surface is a solid body of lens so that the laser light which is led out of said cavity is focused at a specified position.

9. A compact solid-state laser according to claim 1, wherein pumping light from said pumping optical source is led into said cavity through said one surface of said gain crystal or said curving chirped mirror.

10. A compact solid-state laser according to claim 9, wherein a substrate of said curving chirped mirror is a lens which converges the pumping light from said pumping optical source.

11. A compact solid-state laser according to claim 1, wherein said pumping optical source is a solid-state laser or a semiconductor laser.

12. A compact solid-state laser according to claim 1, wherein said gain crystal is Cr- doped YAG, Ti-doped $Al_2O_3$, Cr-doped $LiSrAlF_6$, Cr-doped $Mg_2SiO_4$, or Nd-doped glass.

13. A transmitter comprising: a compact solid-state laser comprising a pumping optical source and a cavity comprising a gain crystal having a reflection coating on one surface, which is excited by said pumping optical source and amplifies lasing light, and a curving chirped mirror, which is positioned on the opposite side of said coated surface of said gain crystal, with a multilayer coating being provided thereon, which compensates the dispersion attributable to said gain crystal; a signal synthesizer into which is introduced an output light from said compact solid-state laser, providing all wavelengths required for wavelength-division-multiplexed communication and said output light is converted into wavelength-division-multiplexed signals in response to signals to be transmitted; and a constant-temperature maintaining device which supports said compact solid-state laser and said signal synthesizer.

14. A transmitter according to claim 13, wherein said pumping light source of the compact solid-state laser, gain crystal and chirped mirror are supported by independent holders so as to be controlled independently for their horizontal and vertical inclinations by adjusting means which adjusts said pumping light source, gain crystal and chirped mirror to have a common optical axis.

15. A transmitter according to claim 14, wherein said holder for supporting said gain crystal has the attachment of a Peltier's element which dissipates the heat produced by said gain crystal.

16. A transmitter according to claim 13, wherein said pumping light source comprises a semiconductor laser, with a Peltier's element used for the temperature control of semiconductor laser being attached to a position close to said semiconductor laser.

17. A compact solid-state laser according to claim 4, wherein a lens in said pumping optical source is tilted by a few or more degrees to compensate astigmatism.

18. A compact solid-state laser according to claim 9, wherein a lens in said optical source is tilted by a few or more degrees to compensate for astigmatism.

19. A laser comprising:

an optical source for generating light;

a chirped mirror having a reflection surface on one side and a back surface on another side, wherein the light generated by the optical source is incident upon the back surface of the chirped mirror;

a gain crystal having a reflection surface on one side and a back surface on another side, wherein the reflection surface of the chirped mirror faces the back surface of the gain crystal; and wherein the optical source, chirped mirror and gain crystal are provided along a common optical axis.

20. A laser according to claim 19, wherein the chirped mirror converges the light from the optical source onto the gain crystal.

21. A laser according to claim 19, wherein said gain crystal is Cr-doped YAG, Ti-doped $Al_2O_3$, Cr-doped $LiSrAlF_6$, Cr-doped $Mg_2SiO_4$, or Nd-doped glass.

22. A laser according to claim 20, wherein said gain crystal is Cr-doped YAG, Ti-doped $Al_2O_3$, Cr-doped $LiSrAlF_6$, Cr-doped $Mg_2SiO_4$, or Nd-doped glass.

* * * * *